(12) United States Patent
Goto et al.

(10) Patent No.: US 6,560,049 B2
(45) Date of Patent: May 6, 2003

(54) LIGHT FILTER USING GLASS CERAMICS

(75) Inventors: Naoyuki Goto, Machida (JP); Mariko Kataoka, Sagamihara (JP); Donald G. Polensky, Morgan Hill, CA (US)

(73) Assignee: Kabushi Kaisha Ohara, Kanagawa-ken (JP)

( * ) Notice: Subject to any disclaimer, the term of this patent is extended or adjusted under 35 U.S.C. 154(b) by 0 days.

(21) Appl. No.: 10/039,012

(22) Filed: Jan. 2, 2002

(65) Prior Publication Data

US 2002/0098964 A1 Jul. 25, 2002

Related U.S. Application Data

(62) Division of application No. 09/551,043, filed on Apr. 17, 2000, now Pat. No. 6,410,466.

(30) Foreign Application Priority Data

Aug. 10, 1999 (JP) ............................................ 11-226947

(51) Int. Cl.$^7$ .............................. G02B 5/22; C03C 1/00; B32B 17/06
(52) U.S. Cl. ........................... 359/885; 501/32; 428/426

(58) Field of Search .......................... 359/885; 501/32, 501/77; 428/426, 428, 457

(56) References Cited

U.S. PATENT DOCUMENTS 6,429,160 B1 * 8/2002 Nakajima et al. ............... 501/5
6,461,733 B1 * 10/2002 Goto .......................... 428/426
2002/0039958 A1 * 4/2002 Goto .......................... 501/77

* cited by examiner

Primary Examiner—Andrey Chang
(74) Attorney, Agent, or Firm—Hedman & Costigan, P.C.

(57) ABSTRACT

Glass-ceramics fo a light filter capable of preventing variation of refractive index in a band-pass filter have a coefficient of thermal expansion within a range from $95 \times 10^{-7}/°C$. to $140 \times 10^{-7}/°C$. within a temperature range from $-20°$ C. to $+70°$ C. and, preferably, Young's modulus of 85 GPa and bending strength of 10 kg/mm$^2$, and light transmittance for plate thickness of 10 mm of 60% or over within a wavelength range from 950 nm to 1600 nm. Predominant crystal phases of these glass-ceramics should preferably be (a) lithium disilicate and (b) one selected from the group consisting of α-quartz, α-quartz solid solution, α-cristobalite and α-cristobalite solid solution.

2 Claims, No Drawings

LIGHT FILTER USING GLASS CERAMICS

This is a divisional of application Ser. No. 09/551,043 filed Apr. 17, 2000, now U.S. Pat. No. 6,410,466. Priority of application Ser. No. 226947/1999 filed on Aug. 10, 1999 in Japan is claimed under U.S.C. §119.

BACKGROUND OF THE INVENTION

This invention relates to glass-ceramics for a light filter and also to a light filter using glass-ceramics.

There are light filters which cut or pass light of a specific wavelength and there are also light filters which reduce intensity of light without depending upon wavelength. The former includes a band-pass filter which passes only a specific wavelength, a notch pass filter which cuts a specific wavelength and high-pass and low-pass filters which pass only wavelengths shorter or longer than a specific wavelength. The latter includes an ND filter.

Light filters can be classified also into an absorption type filter and an interference type filter. A representative absorption type filter is the ND filter and a representative interference type filter is the band-pass filter. A substrate made of plastic is used for absorption type filters such as those for photography. Since a substrate for light filters which are subject to a strong laser beam requires durability and heat resistance property, amorphous glass is exclusively employed for such substrate.

The band-pass filters are made by forming, on a substrate made of, e.g., glass, a multi-layer film of dielectric by alternately laminating an H layer of a dielectric thin film having a high refractive index and an L layer of a dielectric thin film having a low refractive index.

In a band-pass filter which is used for the WDM (wavelength division multiplexing) optical communication system, temperature stability of the center wavelength of the band poses a problem when a narrow band width for passing wavelengths is set for applying the band-pass filter to a wavelength of a higher density. More specifically, the band-pass filter is a sensitive element in which the center frequency of the band varies even with a slight variation in temperature and, therefore, temperature compensation should be made by a temperature controller when the band-pass filter is used. Such temperature controller, however, cannot actually be employed because of limitation in the space where the band-pass filter is located. The temperature stability has become a matter of increasing importance since it is necessary to reduce the band width as the amount of light information increases.

In the past, amorphous glass has been used as a substrate for the band-pass filter. This prior art substrate is not sufficient in its compressive stress to the film and its durability since its thermal expansion property and mechanical strength are not sufficiently high. Further, amorphous glass has a low surface hardness and, moreover, a relatively large amount of alkali ingredient must be added if a high thermal expansion property is to be provided and this poses a problem of elution of alkali ingredient during and after forming of the dielectric film on the substrate. Thus, amorphous glass cannot sufficiently satisfy the demands for a substrate for a light filter, particularly a substrate for a band-pass filter.

It is, therefore, an object of the invention to provide a material suitable for a substrate for a light filter which has eliminated the above described disadvantages of the prior art substrate and has a thermal expansion property which is sufficient for avoiding variation in the refractive index at a temperature at which a filter formed with a mono-layer or multi-layer film is used (i.e., having a high coefficient of thermal expansion and thereby imparting compressive stress to the film to improve temperature stability of the refractive index of the film) and also has a mechanical property which imparts sufficient durability to the filter and further has excellent light transmittance.

It is, another object of the invention to provide a light filter made of such substrate.

SUMMARY OF THE INVENTION

Accumulated studies and experiments made by the inventors of the present invention for achieving the above described objects of the invention have resulted in the finding, which has led to the present invention, that glass-ceramics having a coefficient of thermal expansion, mechanical strength and light transmittance within specific ranges are suitable for achieving these objects of the invention.

According to the invention, there are provided glass-ceramics for a light filter having a coefficient of thermal expansion within a range from $95 \times 10^{-7}/°C$. to $140 \times 10^{-7}/°C$. within a temperature range from $-20°$ C. to $+70°$ C.

In one aspect of the invention, the glass-ceramics have Young's modulus of 85 GPa or over.

In another aspect of the invention, the glass-ceramics have bending strength of 10 $kg/mm^2$ or over.

In another aspect of the invention, light transmittance for plate thickness of 10 mm is 60% or over within a wavelength range from 950 nm to 1600 nm.

In another aspect of the invention, the glass-ceramics have a composition which comprises, in weight percent:

| | |
|---|---|
| $SiO_2$ | 70–77% |
| $Li_2O$ | 8–12% |
| $K_2O$ | 0.5–3% |
| MgO + ZnO + SrO + BaO | 1–5% |
| $P_2O_5$ | 1.5–3% |
| $ZrO_2$ | 2–7% |
| $Al_2O_3$ | 3–9% |
| $Sb_2O_3 + As_2O_3$ | 0–2%. |

In another aspect of the invention, the glass-ceramics contain, as predominant crystal phases, (a) lithium disilicate, and (b) at least one selected from the group consisting of α-quartz, α-quartz solid solution, α-cristobalite and α-cristobalite solid solution.

In another aspect of the invention, the glass-ceramics are substantially free of $Na_2O$ and PbO.

In another aspect of the invention, there is provided a light filter which is made by forming a dielectric film on the above described glass-ceramics.

In still another aspect of the invention, there is provided a light filter which is made by forming a dielectric film on glass-ceramics having a larger coefficient of thermal expansion than dielectric which constitutes the dielectric film.

DETAILED DESCRIPTION OF THE INVENTION

Reasons for limiting the thermal expansion property, Young's modulus, bending strength, light transmittance, composition and predominant crystal phases of the glass-ceramics for a light filter according to the invention will be described below. The composition of the glass-ceramics is expressed on the oxide basis (in weight percent) as in their base glasses.

Description will be made first about thermal expansion property. As described previously, the temperature stability of the center wavelength of the band is very important and glass-ceramics having a larger coefficient of thermal expansion than a material which constitutes the film are required. The studies and experiments conducted by the inventors of the present invention have resulted in the finding that, if the coefficient of thermal expansion within the temperature range from −20° C. to +70° C. is $95 \times 10^{-7}/°C$. or over, sufficient compression stress can be imparted to the film within a temperature range in which the glass-ceramics are used as a band-pass filter and that, if the coefficient of thermal expansion exceeds $140 \times 10^{-7}/°C$., difference in the coefficient of thermal expansion between the substrate and the filter becomes so large that problems such as separation of the film from the substrate take place. A preferable range of the coefficient of thermal expansion is $110 \times 10^{-7}/°C$. to $130 \times 10^{-7}/°C$. and a more preferable range thereof is $120 \pm 5 \times 10^{-7}/°C$.

In the band-pass filter, the temperature stability of the center wavelength depends to some extent on refractive index temperature coefficient of a dielectric which constitutes the thin film and, to a larger extent than that, on a coefficient of thermal expansion of the substrate. This is because refractive index is determined by a film atomic density of the thin film. That is, the higher the film atomic density of the thin film is, the smaller becomes variation caused by the temperature of the center frequency. The film atomic density of the thin film is greatly influenced by the coefficient of thermal expansion of the substrate for the light filter on which the thin film is formed. More specifically, the temperature of the substrate during the film forming process becomes about 200° C. and the substrate thereby is considerably expanded. The thin film is formed on this expanded substrate and, as the substrate is cooled, the thin film is subjected to compressive stress due to difference in the coefficient of thermal expansion between them. As a result, the film atomic density of the thin film increases and the refractive index thereby increases. As the coefficient of thermal expansion of the substrate increases, the compressive stress applied to the dielectric thin film formed on the substrate increases with the result that variation in the refractive index due to temperature at which the filter is used decreases. For this reason, it is desirable to set the coefficient of thermal expansion of the glass-ceramics at a larger value than the coefficient of thermal expansion of the dielectric thin film.

Having regard to severe conditions in which the band-pass filter is used, strength against mechanical deformation, i.e., bending strength and Young's modulus of the glass-ceramics, in addition to the above described properties, cannot be ignored.

As regards Young's modulus, since the substrate is processed to a small chip (2 mm×2 mm×2 mm or below) after forming of a thin film, a high Young's modulus and a high bending strength are required for the substrate. Having regard to such subsequent processing, the glass-ceramic should preferably have Young's modulus of 85 GPa or over and bending strength of 10 kg/mm² or over.

As regards light transmittance, if light transmittance is low, inconveniences such as reduction in the signal-to-noise ratio will take place in producing signals. It is therefore desirable that light transmittance should be as large as possible and it has been found that light transmittance of 60% at the minimum is necessary. The wavelength range used for the band-pass filter is 950 nm to 1600 nm and light transmittance of 60% or over for plate thickness of 10 mm is required for this wavelength range. As to light transmittance within this wavelength range, light transmittance should preferably be 75% or over and, more preferably, 80% or over.

As regards the crystal phases grown in the glass-ceramics, the glass-ceramics should preferably contain, as their predominant crystal phases, (a) lithium disilicate, and (b) at least one selected from the group consisting of α-quartz, α-quartz solid solution, α-cristobalite and α-cristobalite solid solution. By causing these crystal phases to grow in the glass-ceramics, the bending strength and Young's modulus can be markedly increased and the coefficient of thermal expansion within the temperature range from −20° C. to +70° C. can be brought to the range from $95 \times 10^{-7}/°C$. to $140 \times 10^{-7}/°C$. Further, light transmittance at a plate thickness of 10 mm of 60% or over can be realized within the wavelength range from 950 nm to 1600 nm in which the band-pass filter is used.

Reasons for limiting the composition range of the base glass as described above will now be described.

The $SiO_2$ ingredient is a very important ingredient in that, by heating a base glass, it forms lithium disilicate, α-quartz, α-quarts solid solution, α-cristobalite and α-cristobalite solid solution which constitute the predominant crystal phases of the glass-ceramics. If the amount of this ingredient is below 70%, the crystal phases which have grown in the glass-ceramics are instable and their texture tends to become too rough whereas if the amount of this ingredient exceeds 77%, difficulty arises in melting and forming the base glass.

The $Li_2O$ ingredient is a very important ingredient in that, by heating the base glass, it forms lithium disilicate as one of the predominant crystal phases. If the amount of this ingredient is below 8%, difficulty arises in growing of this crystal phases and also in melting of the base glass whereas if the amount of this ingredient exceeds 12%, the crystal phase grown is instable and its texture tends to become too rough and, moreover, chemical durability deteriorates.

The $K_2O$ ingredient is effective for improving the melting property of the glass and preventing the texture of the crystal phase grown from becoming too rough. A preferable amount of this ingredient is 0.5% or over. An excessive amount of this ingredient, however, causes the texture of the crystal grown to become too rough, causes change in the crystal phase and deteriorates chemical durability and, for this reason, the amount of this ingredient should preferably be restricted to 3% or below. The MgO, ZnO, SrO and BaO ingredients are effective for improving the melting property of the glass, preventing the texture of the crystal grown from becoming too rough, and enabling adjustment of light transmittance by adjusting refractive index of the glass phase which constitutes the matrix phase. If the total amount of these ingredients is below 1%, these effects cannot be achieved whereas if the total amount of these ingredients exceeds 5%, the crystal phases obtained are instable and the texture thereof tends to become too rough.

The $P_2O_5$ ingredient is indispensable as a nucleating agent. For achieving this effect, a preferable amount of this ingredient is 1.5% or over. For preventing devitrification of the base glass and maintaining stability in the large scale production, the amount of this ingredient should be limited to 3% or below.

The $ZrO_2$ ingredient is a very important ingredient which, like $P_2O_5$ ingredient, functions as a nucleating agent for the glass and also is effective for making the grown crystal grains finer and improving mechanical strength and chemical durability of the material. For achieving these effects, a preferable amount of this ingredient is 2% or over. If an excessive amount of this ingredient is added, difficulty arises in melting the base glass and a material such as $ZrSiO_4$ is left unmelted. For this reason, the amount of this ingredient should be limited to 9% or below.

The $Al_2O_3$ ingredient is an ingredient which improves chemical durability and mechanical strength, particularly bending strength, of the glass-ceramics. For achieving the objects of the invention, it is necessary to add 3% or over, preferably 4% or over, of this ingredient. If an excessive amount of this ingredient is added, the melting property and resistance to devitrification of the glass deteriorate and, moreover, β-spodumene and β-cristobalite grow as crystal phases. The β-spodumene and β-cristobalite are crystals having a very small coefficient of thermal expansion and growth of these crystals significantly reduces a coefficient of thermal expansion of the glass-ceramics obtained. Therefore, a preferable amount of this ingredient is 9% or below and, preferably, 8% or below.

The $Sb_2O_3$ and $As_2O_3$ ingredients may be added as a refining agent. Addition of a total sum of one or both of these ingredients up to 2% will suffice. A preferable total sum is 1% or less.

The reason for substantially excluding $Na_2O$ and PbO in the glass-ceramics will be described. In forming a multi-layer film on a substrate, $Na_2O$ contained in a material poses a problem because Na ions are eluted into the multi-layer film resulting in deterioration of the film properties. As to PbO, this ingredient is undesirable from the standpoint of protecting the environment and use of this ingredient should be avoided to the maximum extent possible.

For manufacturing the glass-ceramics for a light filter according to the invention, the base glass having the above described composition is melted, is subjected to heat forming and/or cold forming, is heat treated for producing a crystal nucleus under a temperature within a range from 500° C. to 600° C. for about one to seven hours, and further is heat treated for crystallization under a temperature within a range from 700° C. to 780° C. for about one to seven hours.

The glass-ceramics thus obtained by the heat treatment had, as their predominant crystal phases, (a) lithium disilicate, and (b) at least one selected from the group consisting of α-quartz, α-quartz solid solution, α-cristobalite and α-cristobalite solid solution.

By lapping and polishing the glass-ceramics thus obtained by a conventional method, glass-ceramic substrates for a light filter having surface roughness (Ra) (arithmetic mean roughness) within a range from 1.0 Å to 5.0 Å are provided. The glass-ceramics according to the invention are suitable for an interference type light filter in which a multi-layer film of dielectric is formed on a glass-ceramic substrate, particularly, for a band-pass filter having a dielectric multi-layer film formed by alternately laminating a dielectric thin film (H layer) having a high refractive index and a dielectric thin film (L layer) having a low refractive index.

As the dielectric, inorganic oxides such as $TiO_2$, $Ta_2O_2$, $Nb_2O_5$ and $SiO_2$ may preferably be used. In a band-pass filter used for the wavelength range from 950 nm to 1600 nm, combinations of $TiO_2/SiO_2$, $Ta_2O_2/SiO_2$ and $Nb_2O_5/SiO_2$ may preferably be used as combinations of the H layer and the L layer.

The light filter of the present invention can be provided by forming a dielectric thin film on the surface of the glass-ceramic substrates. For forming the thin film, deposition, RF ion plating, magnetron spattering, plasma ion plating etc. may be employed. Among them, deposition is particularly preferable.

EXAMPLES

Examples of the invention will now be described. Tables 1, 2 and 3 show Examples No. 1 to No. 8 of the glass-ceramics for a light filter according to the invention and a comparative example of a prior art glass substrate for a light filter with respect to their composition, grown crystal phases, coefficient of thermal expansion, Young's modulus, bending strength and light transmittance. In the tables, lithium disilicate is abbreviated as "LD".

TABLE 1

| | Examples | | |
|---|---|---|---|
| | 1 | 2 | 3 |
| $SiO_2$ | 76.3 | 73.9 | 77.2 (Wt. %) |
| $Li_2O$ | 9.9 | 9.0 | 9.5 |
| $P_2O_5$ | 2.0 | 2.1 | 2.0 |
| $ZrO_2$ | 2.3 | 4.0 | 1.3 |
| $Al_2O_3$ | 7.0 | 6.0 | 4.0 |
| MgO | 0.8 | 0.5 | 0.8 |
| ZnO | 0.5 | 0.5 | 0.5 |
| SrO | | 2.5 | |
| BaO | | | 2.5 |
| $K_2O$ | 1.0 | 1.3 | 2.0 |
| $Sb_2O_3$ | 0.2 | 0.2 | 0.2 |
| $As_2O_3$ | | | |
| Predominant crystal phase | LD α-quartz | LD α-quartz | LD α-quartz α-cristobalite |
| Coefficient of thermal expansion (× $10^{-7}$/° C.) (−20° C. to 70° C.) | 110 | 122 | 130 |
| Young's modulus (GPa) | 98 | 100 | 90 |
| Bending strength (kg/mm$^2$) | 11 | 20 | 15 |
| Light transmittance (%) (950–1600 nm) | 75 | 80 | 65 |

TABLE 2

| | Examples | | |
|---|---|---|---|
| | 4 | 5 | 6 |
| $SiO_2$ | 76.6 | 73.9 | 77.2 (Wt. %) |
| $Li_2O$ | 9.9 | 9.0 | 9.0 |
| $P_2O_5$ | 2.0 | 2.1 | 2.0 |
| $ZrO_2$ | 2.3 | 4.0 | 1.3 |
| $Al_2O_3$ | 7.0 | 6.0 | 4.0 |
| MgO | 0.5 | 0.5 | 0.8 |
| ZnO | 0.5 | 0.5 | 0.5 |
| SrO | | 1.5 | 0.5 |
| BaO | | 1.0 | 2.5 |
| $K_2O$ | 1.0 | 1.3 | 2.0 |
| $Sb_2O_3$ | 0.2 | 0.2 | 0.2 |
| $As_2O_3$ | | | |
| Predominant crystal phase | LD α-quartz | LD α-quartz | LD α-quartz α-cristobalite |
| Coefficient of thermal expansion (× $10^{-7}$/° C.) (−20° C. to 70° C.) | 119 | 127 | 130 |
| Young's modulus (GPa) | 98 | 100 | 90 |
| Bending strength (kg/mm$^2$) | 15 | 23 | 12 |
| Light transmittance (%) (950–1600 nm) | 85 | 80 | 62 |

TABLE 3

|  | Examples | | Comparative |
|---|---|---|---|
|  | 7 | 8 | Example 1 |
| $SiO_2$ | 73.9 | 75.3 | 47.87 (Wt. %) |
| $Li_2O$ | 8.5 | 9.0 | NaO = 5.0 |
| $P_2O_5$ | 2.1 | 2.2 | $B_2O_3$ = 4.7 |
| $ZrO_2$ | 4.2 | 4.5 | $TiO_2$ = 3.88 |
| $Al_2O_3$ | 6.0 | 5.5 | 3.7 |
| MgO | 0.5 | 0.5 |  |
| ZnO | 0.5 | 0.5 |  |
| SrO | 2.5 | 1.0 |  |
| BaO | 1.0 |  | 24.45 |
| $K_2O$ | 0.6 | 1.3 | 12.3 |
| $Sb_2O_3$ | 0.2 | 0.2 | 0.1 |
| $As_2O_3$ |  |  |  |
| Predominant crystal phase | LD α-quartz | LD α-quartz |  |
| Coefficient of thermal expansion (× $10^{-7}$/° C.) (−20° C. to 70° C.) | 120 | 122 | 93 |
| Young's modulus (GPa) | 94 | 99 | 75 |
| Bending strength (kg/mm²) | 28 | 25 | 5 |
| Light transmittance (%) (950–1600 nm) | 85 | 83 | 90 |

For manufacturing the glass-ceramics of the above described Examples No. 1 to No. 8, materials including oxides, carbonates and nitrates were weighed and mixed and molten in a conventional melting apparatus at a temperature within the range from about 1350° C. to 1450° C. The molten glass was stirred to homogenize it and thereafter formed into a predetermined shape and annealed to provide a formed glass. Then, the formed glass was subjected to heat treatment to produce the crystal nucleus under a temperature within the range from 500° C. to 600° C. for about one to seven hours and then was subjected to a further heat treatment for crystallization under a temperature within the range from 700° C. to 780° C. for about one to seven hours to produce the desired glass-ceramics. Then, these glass-ceramics were lapped with diamond pellets of 800–2000# for 5 minutes to 30 minutes and were finally polished with cerium oxide polishing grains having an average diameter of 0.02 μm to 3 μm for 30 minutes to 60 minutes. Surface roughness (Ra) (roughness at the center line) was 5 Å or below.

Crystal phases grown were identified by an X-ray Diffractometer (XRD) and an Energy Dispersive X-ray Spectroscopy (EDS).

Comparing Examples No. 1 to No. 8 with Comparative Example 1, the coefficient of thermal expansion of the prior art glass substrate for a light filter was $93 \times 10^{-7}$/°C. which was not sufficient for imparting compressive stress to a formed film. The prior art glass substrate exhibited also low Young's modulus of 75 GPa and bending strength of 5 kg/mm². In contrast, the glass-ceramics of the present invention had a sufficient coefficient of thermal expansion for imparting compressive stress to the formed film and also sufficient Young's modulus and bending strength which shows that the glass-ceramics of the present invention are suitable for substrates for a light filter.

Interference type light filters which were provided by forming multi-layer films of $TiO_2/SiO_2$, $Ta_2O_2/SiO_2$ and $Nb_2O_5/SiO_2$ on the glass-ceramic substrates of the above described Examples had an excellent temperature stability of its center wavelength and were found to be most suitable for a band-pass filter for optical communication.

As described in the foregoing, according to the invention, the disadvantages of the prior art substrates are overcome and glass-ceramic substrates for a light filter having an excellent temperature stability of a center wavelength are provided. These features, i.e., high light transmittance, high thermal expansion property, high Young's modulus and high bending strength, are suitable for an interference type filter, particularly a band-pass filter and are most suitable for WDM and DWDM (density wavelength division multiplexing) in optical communication systems. Further, the band-pass filter elements which are provided by forming multi-layer dielectric films of $TiO_2/SiO_2$, $Ta_2O_2/SiO_2$ and $Nb_2O_5/SiO_2$ on the glass-ceramic substrates of the invention have an excellent temperature stability of the center wavelength and can be used not only for optical communication systems on the ground but also for space-based satellites.

What is claimed is:

1. A light filter which is made by forming a dielectric film on glass-ceramics, said glass-ceramics having a coefficient of expansion within a range from $95 \times 10^{-7}$/°C. to $140 \times 10^{-7}$/°C. within a temperature range from −20° C. to +70° C.

2. A light filter which is made by forming a dielectric film on glass-ceramics having a larger coefficient of thermal expansion than dielectric which constitutes the dielectric film, said glass-ceramics having a coefficient of expansion within a range from $95 \times 10^{-7}$/°C. to $140 \times 10^{-7}$/°C. within a temperature range from −20° C. to +70° C. and having a Young's modulus of 85 GPa or over.

* * * * *